US012587927B2

(12) United States Patent (10) Patent No.: US 12,587,927 B2
Freda et al. (45) Date of Patent: Mar. 24, 2026

(54) METHODS AND APPARATUS FOR CONDITIONAL RECONFIGURATION IN INTEGRATED ACCESS AND BACKHAUL (IAB)

(71) Applicant: InterDigital Patent Holdings, Inc., Wilmington, DE (US)

(72) Inventors: Martino Freda, Laval (CA); Oumer Teyeb, Montreal (CA); Yugeswar Deenoo Narayanan Thangaraj, Chalfont, PA (US); Tuong Hoang, Montreal (CA); Jaya Rao, Montreal (CA); Ghyslain Pelletier, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 349 days.

(21) Appl. No.: 18/032,738

(22) PCT Filed: Oct. 21, 2021

(86) PCT No.: PCT/US2021/055960
§ 371 (c)(1),
(2) Date: Apr. 19, 2023

(87) PCT Pub. No.: WO2022/087208
PCT Pub. Date: Apr. 28, 2022

(65) Prior Publication Data
US 2023/0388884 A1 Nov. 30, 2023

Related U.S. Application Data

(60) Provisional application No. 63/167,730, filed on Mar. 30, 2021, provisional application No. 63/094,658, filed on Oct. 21, 2020.

(51) Int. Cl.
H04W 36/22 (2009.01)
H04W 36/00 (2009.01)

(52) U.S. Cl.
CPC ....... H04W 36/22 (2013.01); H04W 36/0085 (2018.08)

(58) Field of Classification Search
CPC ............. H04W 36/22; H04W 36/0085; H04W 84/047; H04W 36/30; H04W 36/302
See application file for complete search history.

(56) References Cited

U.S. PATENT DOCUMENTS

2012/0202503 A1 8/2012 Kitaji
2013/0052941 A1* 2/2013 Kitaji ................. H04B 7/15592
455/7

(Continued)

OTHER PUBLICATIONS

Third Generation Partnership Project (3GPP), "Technical Specification Group Radio Access Network: NR; Study on Integrated Access and Backhaul; (Release 16)", 3GPP TR 38.874 V16.0.0, Dec. 2018, 111 pages.

(Continued)

*Primary Examiner* — Kan Yuen
(74) *Attorney, Agent, or Firm* — VOLPE KOENIG

(57) ABSTRACT

The disclosure pertains to methods and apparatus for a mobility action in IAB in wireless communication networks. A method implemented in a Wireless Transmit/Receive Unit (WTRU) may comprises the steps of: determining traffic load information associated with a parent node; measuring received power of candidate parent nodes; selecting a candidate parent node based on the measured received power; performing a mobility action to the selected candidate parent node based on the determined traffic load information; and transmitting, to a child node, a message, the message comprising an information indicating the selected candidate.

18 Claims, 8 Drawing Sheets

(56) References Cited

U.S. PATENT DOCUMENTS

| | | | | |
|---|---|---|---|---|
| 2013/0115955 A1* | 5/2013 | Deng | ............... | H04W 48/16 |
| | | | | 455/437 |
| 2014/0349647 A1* | 11/2014 | Chen | ............. | H04W 36/00837 |
| | | | | 455/436 |
| 2018/0160336 A1* | 6/2018 | Dai | ............. | H04W 36/08 |
| 2019/0223078 A1* | 7/2019 | Sirotkin | .............. | H04B 7/155 |
| 2019/0297555 A1* | 9/2019 | Hampel | .............. | H04L 47/29 |
| 2022/0256576 A1* | 8/2022 | Wu | ............ | H04L 1/188 |
| 2023/0189050 A1* | 6/2023 | Rao | ............ | H04L 47/283 |
| | | | | 370/231 |
| 2023/0300698 A1* | 9/2023 | Liu | ............ | H04W 36/08 |
| | | | | 370/331 |
| 2025/0008610 A1* | 1/2025 | Freda | ............. | H04W 36/36 |

OTHER PUBLICATIONS

Third Generation Partnership Project (3GPP), "Technical Specification Group Radio Access Network; NR; Backhaul Adaptation Protocol (BAP) Specification (Release 16)", 3GPP TS 38.340, V16.2.0, Sep. 2020, 22 pages.

Vivo, "Initial consideration on dynamic route selection", 3GPP Tdoc R2-1804996, 3GPP TSG-RAN WG2 Meeting #101bis, Sanya, China, Apr. 16, 2018, 4 pages.

Third Generation Partnership Project (3GPP), "Technical Specification: 5G; NR; Radio Resource Control (RRC); Protocol Specification (Release 16)", 3GPP TS 38.331 V16.2.0, Nov. 2020, 921 pages.

Third Generation Partnership Project (3GPP), "Technical Specification Group Radio Access Network: NR; NR and NG-RAN Overall Description; Stage 2 (Release 16)", 3GPP TS 38.300 V16.2.0, Jul. 2020, 148 pages.

LG Electronics, "Issue on inter-donor IAB-node migration", 3GPP Tdoc R3-205251, 3GPP TSG-RAN WG3 #109-e Online meeting, Aug. 17, 2020, 4 pages.

Lenovo et al., "Parent node selection for migration", 3GPP Tdoc R2-1904260, 3GPP TSG-RAN WG2 Meeting #105bis, Xi'an, China, Apr. 8, 2019, 4 pages.

* cited by examiner

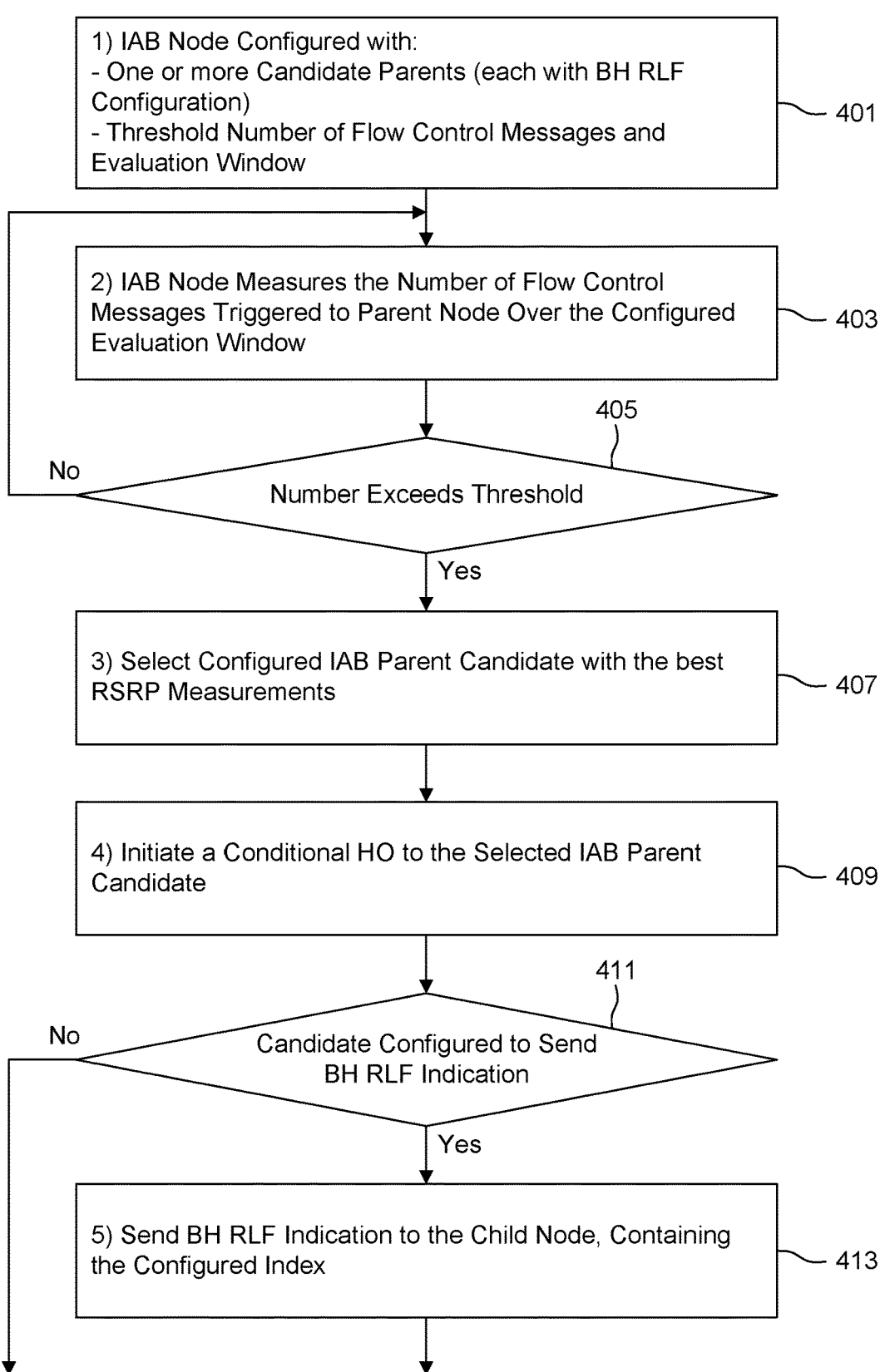

1) IAB Node Configured with:
- One or more Candidate Parents (each with BH RLF Configuration)
- Threshold Number of Flow Control Messages and Evaluation Window

— 401

2) IAB Node Measures the Number of Flow Control Messages Triggered to Parent Node Over the Configured Evaluation Window

— 403

405

No

Number Exceeds Threshold

Yes

3) Select Configured IAB Parent Candidate with the best RSRP Measurements

— 407

4) Initiate a Conditional HO to the Selected IAB Parent Candidate

— 409

411

No

Candidate Configured to Send BH RLF Indication

Yes

5) Send BH RLF Indication to the Child Node, Containing the Configured Index

METHODS AND APPARATUS FOR CONDITIONAL RECONFIGURATION IN INTEGRATED ACCESS AND BACKHAUL (IAB)

CROSS REFERENCE TO RELATED APPLICATIONS

This application is a U.S. National Stage Application under 35 U.S.C. § 371 of International Patent Application No. PCT/US2021/055960, filed Oct. 21, 2021, which claims the benefit of U.S. Provisional Application Nos. 63/094,658, filed Oct. 21, 2020, and 63/167,730 filed Mar. 30, 2021, each of which is incorporated herein by reference in its entirety.

FIELD

This disclosure pertains to methods and apparatus for performing handover in IAB in wireless communication networks.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGs.") indicate like elements, and wherein:

FIG. 4 is a flow chart illustrating conditional handover in IAB in accordance with an embodiment.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof (and vice versa).

Example Networks

Figure 1A:
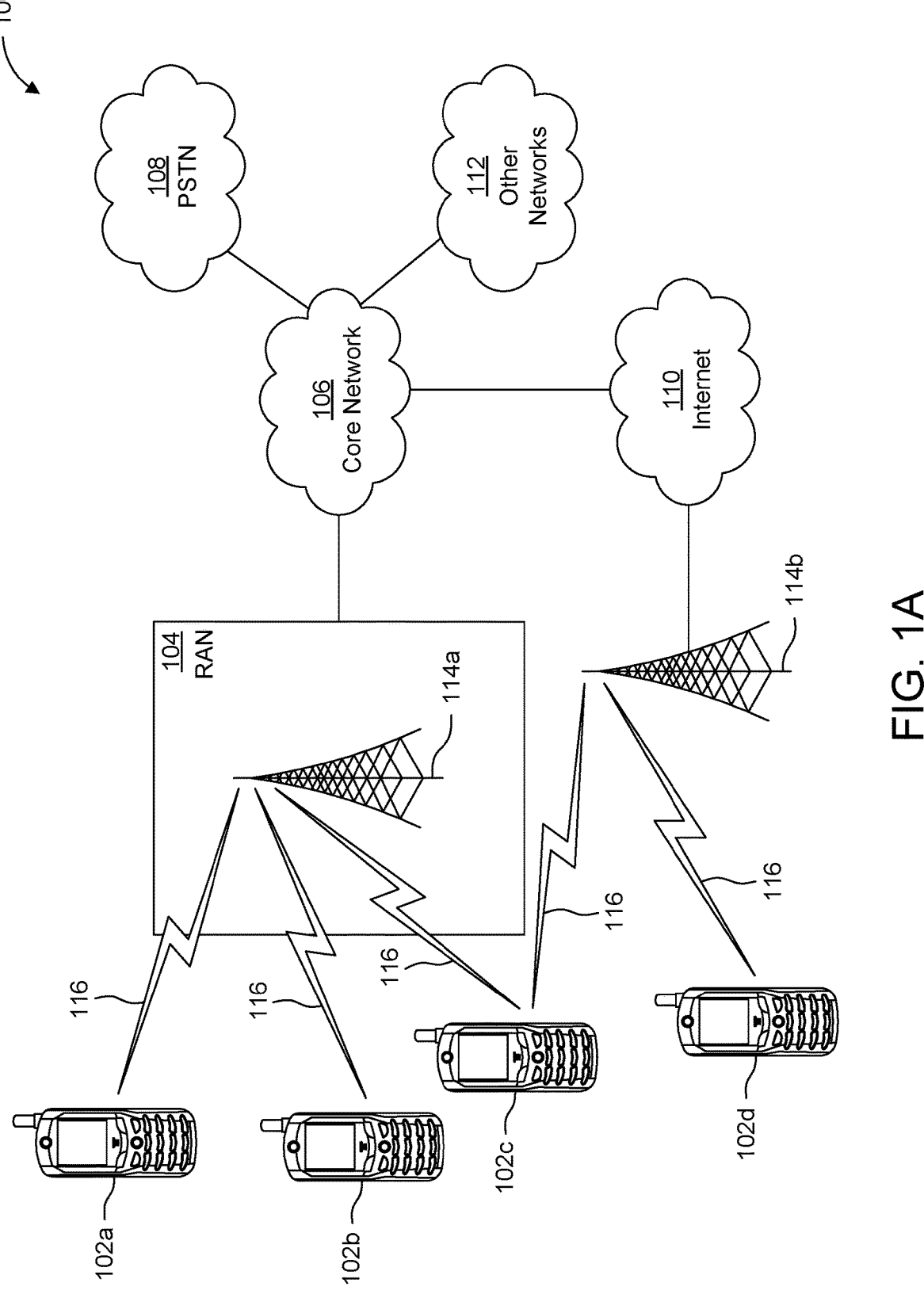
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
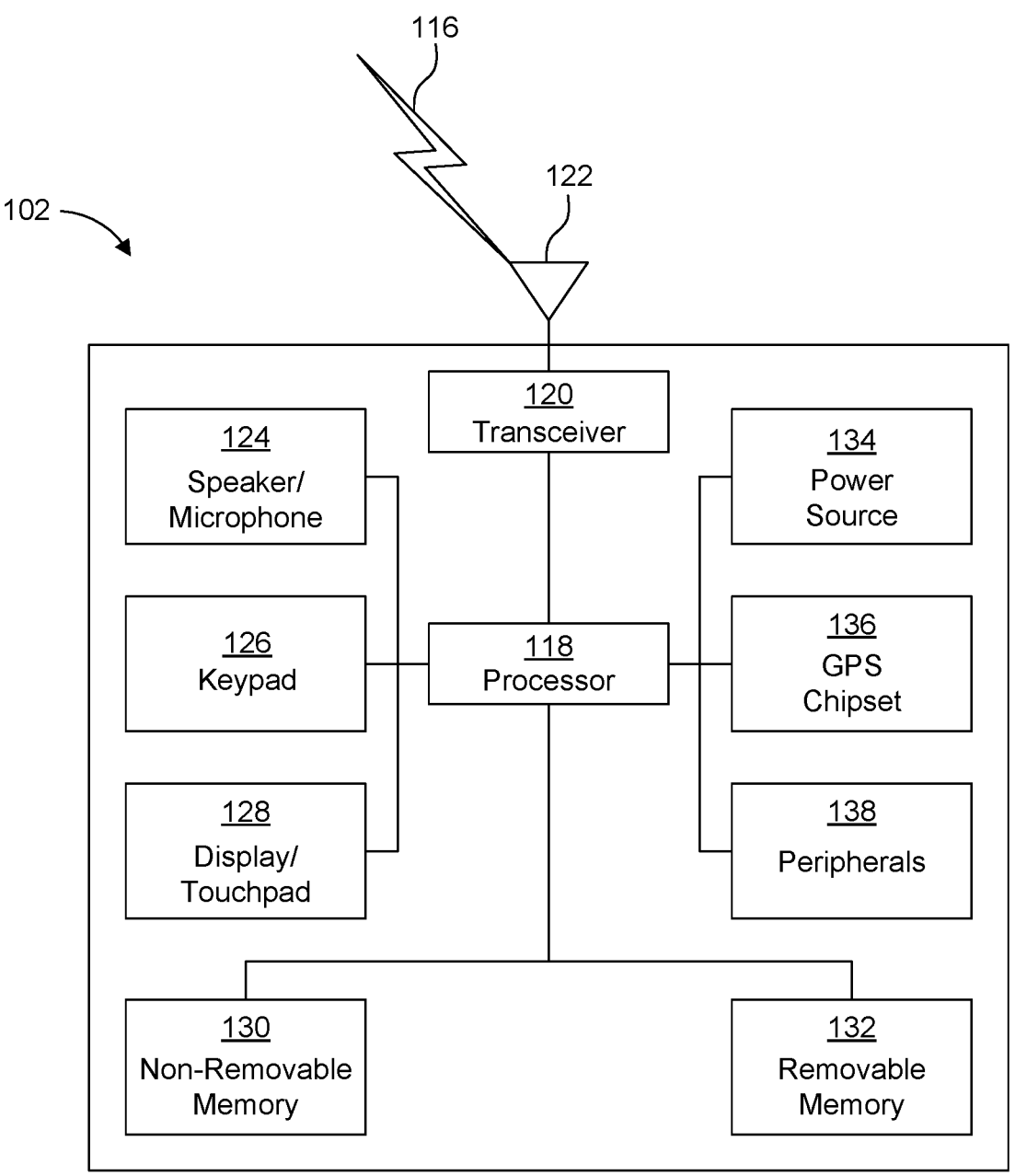
FIG. 1B is a system diagram illustrating an example wireless transmit/receive unit (WTRU) that may be used within the communications system illustrated in FIG. 1A according to an embodiment.
Figure 1C:
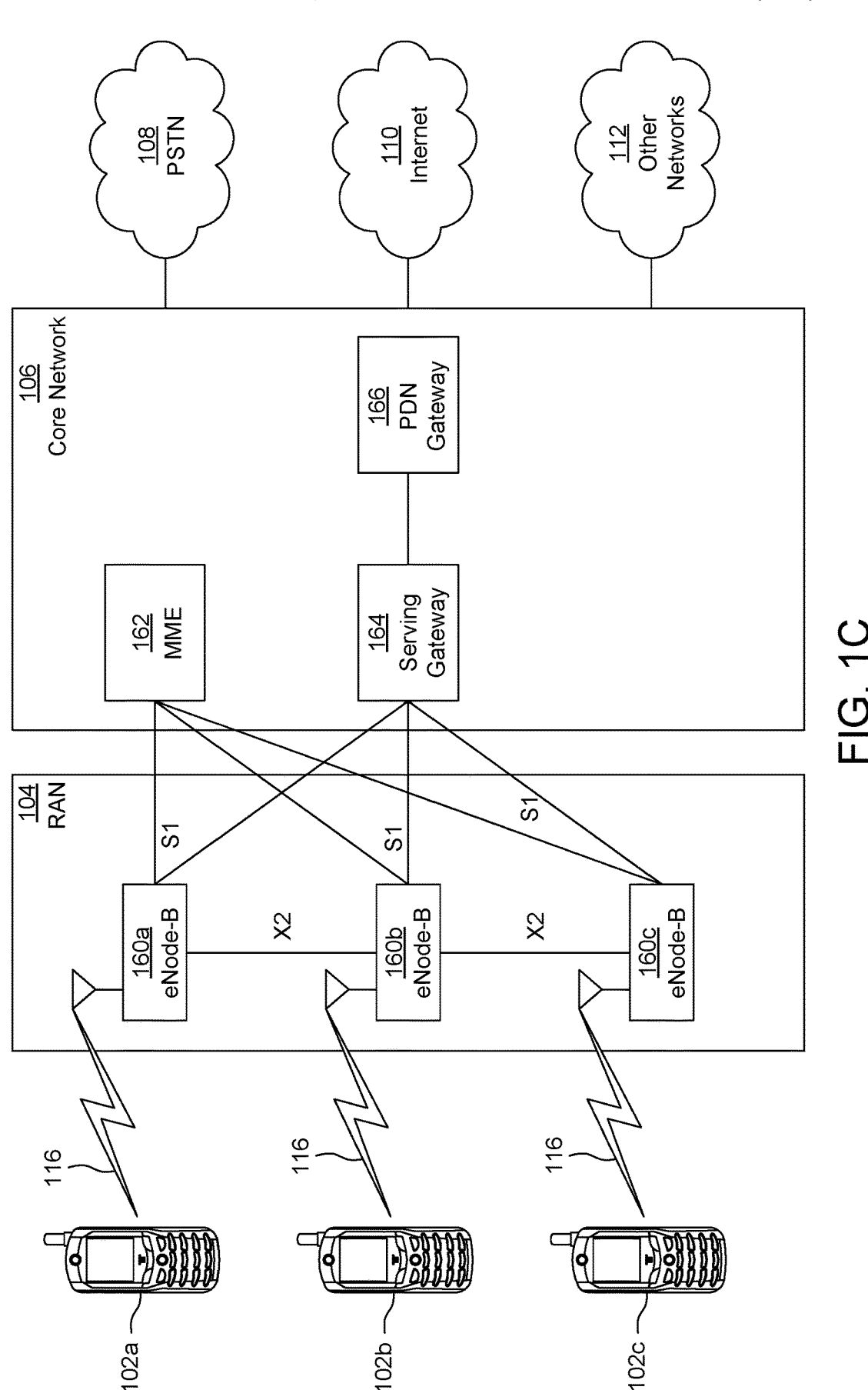
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and DL (e.g., for reception)) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
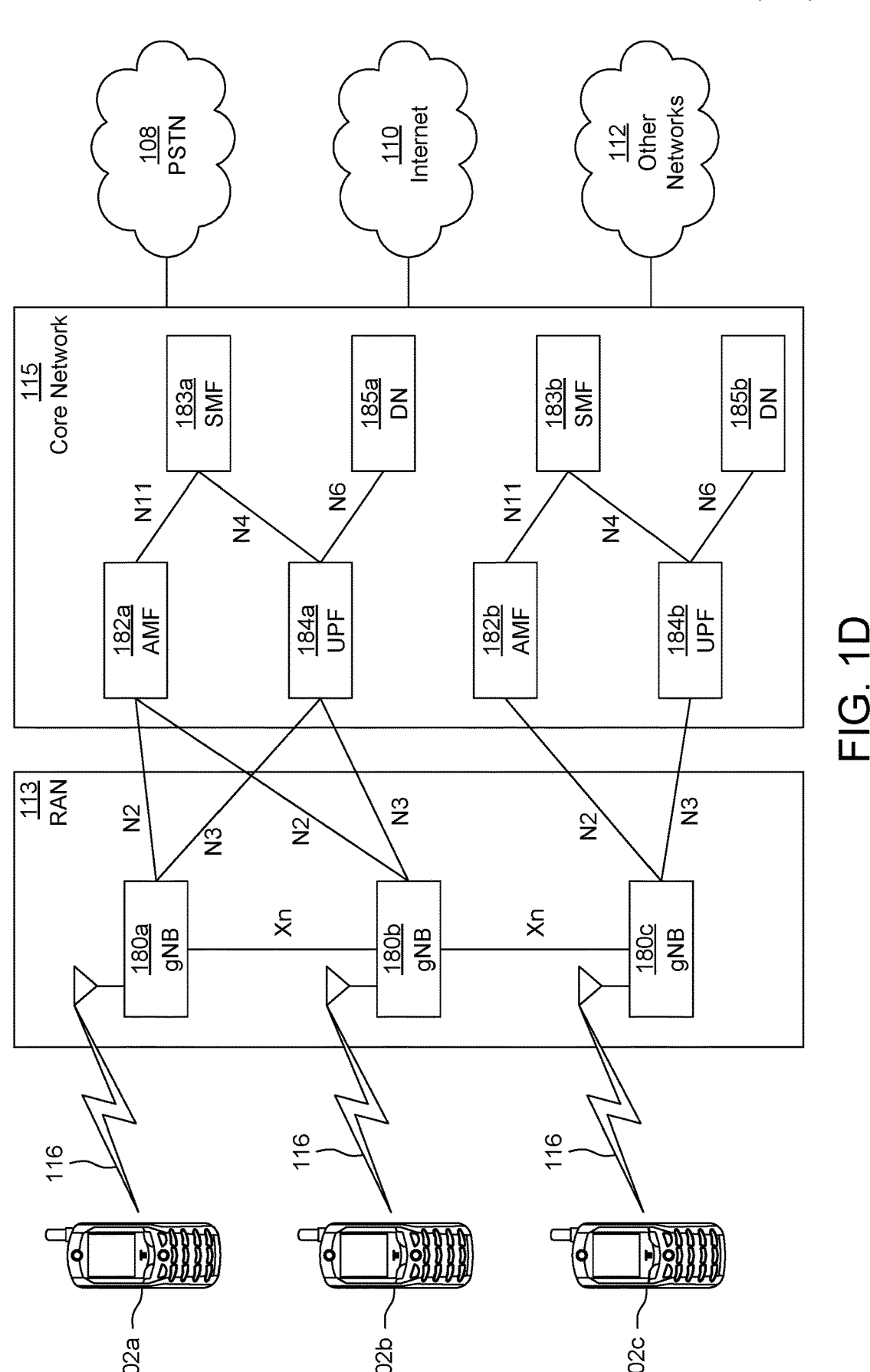
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eM BB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Conditional Handover and Cloud Packet Core in New Radio

Conditional Handover and Conditional Primary Secondary Cell (PSCell) Change and/or Addition in NR Release 16 (Rel.-16) NR introduced the concept of conditional handover (CHO), conditional PSCell change (CPC) and conditional PSCell addition (CPA). In CHO, a WTRU may be configured (via a radio resource control (RRC) reconfiguration message) with a handover (HO) target (e.g., a target cell configuration) and an associated condition in terms of a cell measurement event (e.g., event A3/A5, and corresponding cells). A WTRU may receive signaling that includes reconfiguration information for conditional mobility e.g., a CHO command such as a RRCReconfiguration message that includes the conditionalReconfiguration information element. The WTRU may initiate monitoring of the associated condition. When the condition is satisfied, the WTRU may trigger a HO (e.g., reconfiguration) to the associated cell with the given configuration.

For CPC and CPA, a WTRU may trigger a PSCell change, or PSCell addition, associated with a stored PSCell configuration, based on an associated condition defined by a measurement event.

Integrated Access and Backhaul in Rel-16

An backhaul connection among base stations based on an integrated access and backhaul (IAB) solution may use a part of the wireless spectrum (e.g., instead of fiber). Use of an IAB solution may allow a more flexible and less expensive deployment of dense networks as compared to deployments where there is a dedicated fiber link to the base stations. In Rel-16, a full-fledged, multi-hop, IAB solution that is based on the split architecture of rel-15 (e.g., Centralized Unit (CU) and Distributed Unit (DU) architecture) has been specified for NR. The user plane (UP) and control plane (CP) protocol architectures for the Rel-16 IAB solution are set forth in 3GPP Technical Report 38.874. FIGS. 8.2.1-1 d) and 8.3.5-4 a) of 3GPP Technical Report 38.874 illustrate user plane (UP) and control plane (CP) protocol architectures, respectively, and are reproduced herein as FIGS. 2 and 3, respectively, for convenient reference.

Figure 2:
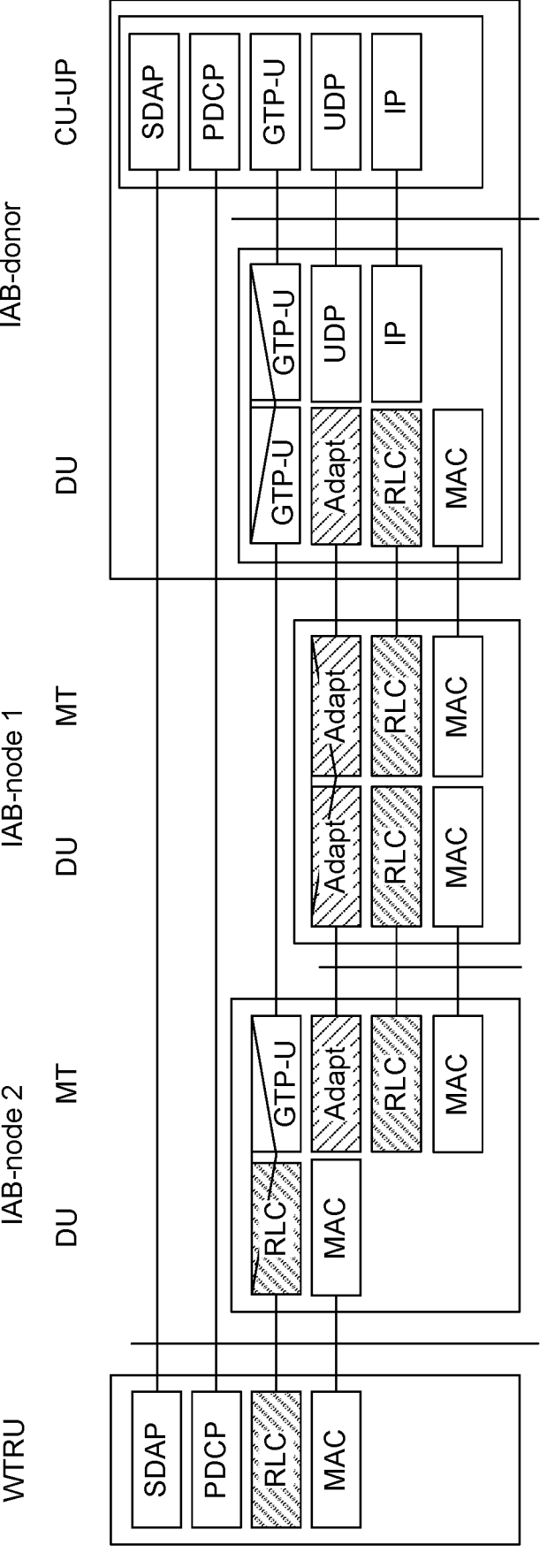
FIG. 2 is a diagram of a user plane protocol architecture for 5G.
Figure 3:
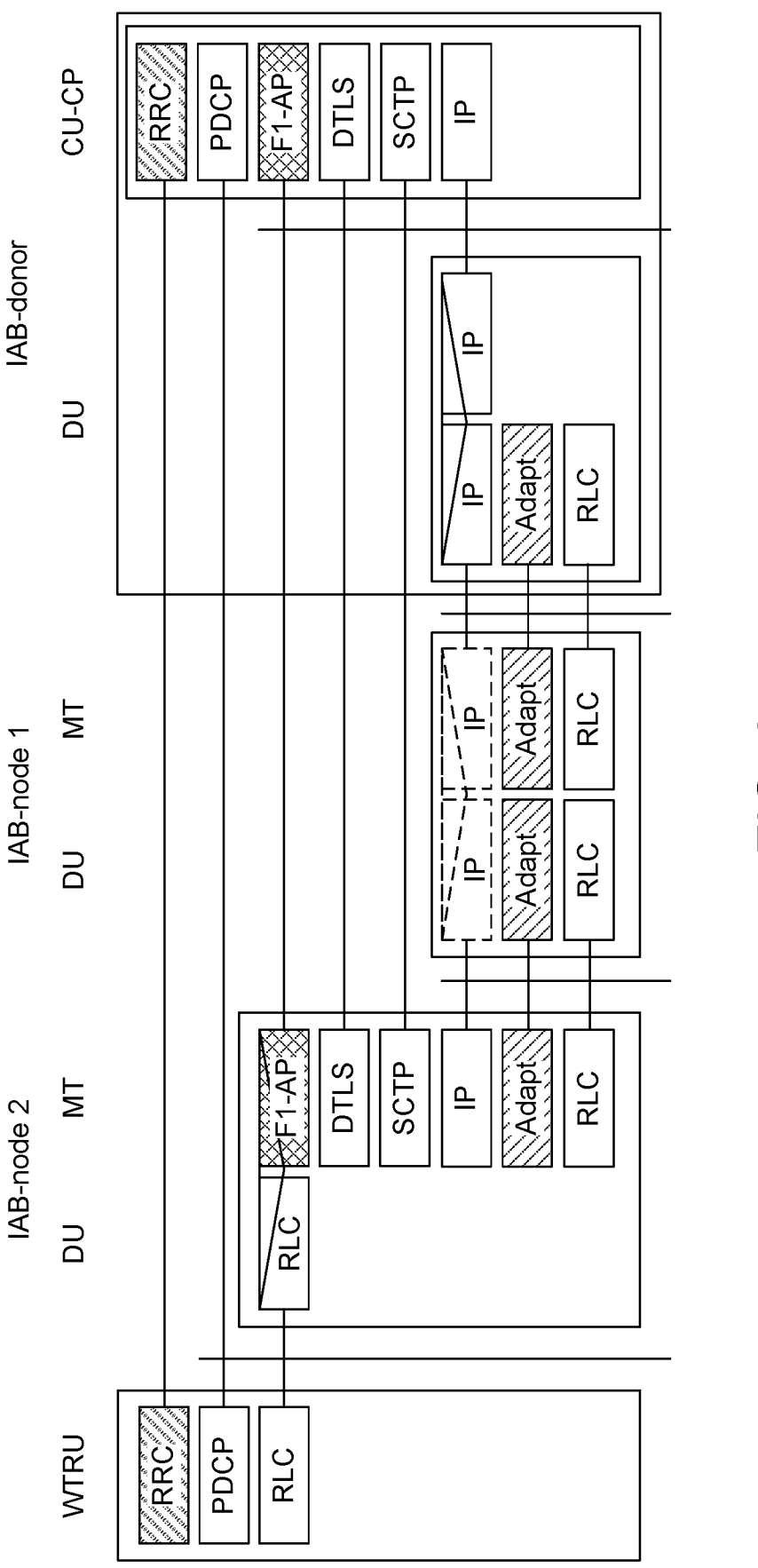
FIG. 3 is a diagram of a control plane protocol architecture for 5G.

Protocol stacks of a IAB-donor (e.g., a base station), a first IAB node ("IAB-node 1"), a second IAB node ("IAB-node 2") and a WTRU are shown in each of FIGS. 2 and 3. The protocol stacks for each of the IAB-nodes 1 and 2 may include a mobile termination (MT) part, and a DU part. The IAB-donor node may include a DU part.

The MT part may be used to communicate with a parent node. The MT part may be used to connect to a parent node (e.g., a IAB donor, or the DU part of another IAB node). In other words, an IAB node may operate as a parent node, when its DU part is connected to other IAB nodes' MTs. The DU part may be used to communicate with any of a child node and the WTRU. The DU part of an IAB node may be used to serve WTRUs or the MT part of child nodes. In other words, an IAB node may operate as a child node when its MT is connected to another IAB node's DU. Both the UP and CP architectures may employ a routing/forwarding approach inspired by IP networks. Any (e.g., each) of the IAB nodes 1 and 2 may be assigned an IP address (and associated L2 addresses) by the IAB-donor. The assigned IP addresses are routable from a CU-CP functionality of the IAB-donor.

An IAB node (e.g., IAB-node 2) that serves a WTRU may be referred to as the access IAB node. A node between the IAB-donor and an access IAB node may be referred to an intermediate IAB nodes Intermediate IAB nodes may forward packets transparently based on route identifiers/destination addresses. An IAB node may be both an access IAB node (for the WTRUs that are directly connected to it) and an intermediate IAB node (for WTRUs that are served by its descendant IAB nodes).

The IAB-nodes 1 and 2 may terminate the DU functionality. The IAB-donor may terminate the CU functionality. The IAB-node 2 and the IAB-donor (e.g., the CU thereof), regardless of how many hops apart they are physically from each other, may form one logical base station unit employing a CU/DU split architecture.

Hop-by-hop radio link control (RLC) may be used between the IAB nodes, instead of an End-to-End (E2E) RLC between the IAB-donor (e.g., DU functionality thereof) and the WTRU. An adaption layer, referred to as backhaul adaptation protocol (BAP), may be used to enable efficient multi-hop forwarding. The IAB-donor may assign a unique L2 address (BAP address) to each of the IAB nodes that it controls. In case of multiple paths, multiple route identifiers (IDs) may be associated with each BAP address. The BAP of the origin node for the DL traffic (e.g., IAB-donor), and/or the access IAB node for the UL (e.g., IAB-node 2) may add respective BAP headers to packets that the BAP of the origin node and/or access IAB node transmit. The BAP header may include a BAP routing ID (e.g., BAP address of the destination/source IAB node and the path ID). An IAB node may determine that a packet is destined for it if the packet includes a BAP routing ID that includes a BAP address that is matches a BAP address of such IAB node. The IAB node may pass the packet on to higher layers for processing (e.g., an F1-C/U message destined for the DU functionality of the IAB node, an F1-C message that includes signaling radio bearer (SRB) data for a WTRU directly connected to the IAB node, or an F1-U message that includes Dedicated Radio Bearer (DRB) data for a WTRU directly connected to the IAB node). Alternatively, the IAB node may employ routing/mapping tables to determine where to forward the data. Each IAB node may have a routing/mapping table (configured by the IAB donor (e.g., by the CU functionality thereof) including the next hop identifier for each BAP routing ID. Separate routing/mapping tables may be kept for the DL and UL. The DU part of the IAB node, for example, may use the DL routing/mapping table. The MT part of the IAB node, for example, may use the UL routing/mapping table.

Backhaul (BH) RLC channels may be used for transporting packets between IAB nodes (or between an IAB-donor (e.g., a DU part thereof) and an IAB node). A BH RLC channel configuration may include and/or be linked to an associated RLC and logical channel (LCH) configuration. Either a many-to-one (N:1) mapping or one-to-one (1:1) mapping may be performed between WTRU radio bearers and BH RLC channels. The N:1 mapping may multiplex several WTRU radio bearers into a single BH RLC channel based on specific parameters, such as QoS profile of the bearers. The N:1 mapping may be suitable for bearers that do not have very strict requirements such as best effort bearers. The 1:1 mapping may map radio bearer associated with any (e.g., each) WTRU onto a separate BH RLC channel. The 1:1 mapping may be designed to ensure finer QoS granularity at the WTRU radio bearer level. The 1:1 mapping may be suitable for bearers with strict throughput or/and latency requirements, such as Guaranteed Bit Rate (GBR) bearers or Voice over IP (VoIP) bearers.

When an IAB node detects a BH radio link failure (RLF), the IAB node may send a BH RLF indication (which may be included in a BAP control PDU) to its descendant nodes. Upon receiving such an indication from a parent node, the IAB node may initiate procedures such as re-establishment to another parent node or pause transmission/reception with the concerned parent node. The exact behavior on the reception of BH RLF indications is left to IAB/network implementation in Rel-16.

In a multi-hop IAB network, data congestion may occur on intermediate IAB nodes, which may lead to packet drops if left unresolved. Though higher layer protocols, such as TCP, may be used to assure reliability, TCP congestion avoidance and slow start mechanisms may be very costly to overall E2E performance (e.g., throughput degradation). IAB networks may employ flow control. For the DL, both E2E and hop-by-hop (H2H) flow control mechanisms are available.

The DL E2E flow control may be based on the DL Data Delivery Status (DDDS) specified for CU/DU split architecture in NR rel-15 (TS 38.425). In DDDS, the DU (in the context of IAB networks, the DU part of the access IAB node) may report to the CU (in the context of IAB networks, the IAB-donor (e.g., the CU-UP thereof)) information such as any of a desired buffer size per DRB, a desired data rate per DRB, a highest successfully delivered Packet Data Control Protocol (PDCP) Sequence Number (SN) (PDCP SN), lost packets (i.e., not ACKed by the DU at RLC level), etc. In Rel-16, only access IAB nodes may perform DDDS (i.e., IABs report only information concerning the DRBs of the WTRUs that they are directly serving), and no information is provided regarding the BH RLC channels.

For DL H2H flow control, an IAB node may generate a flow control message (which may be included in a BAP control packet data unit (PDU)) when its buffer load exceeds a certain level or when it receives a flow control polling message from a peer BAP of another IBA node (e.g., a child node). In Rel-16, the H2H flow control information may indicate the available buffer size. In Rel-16, the H2H flow control information may be at the granularity of BH RLC channels (e.g., available buffer=value_1 for BH RLC channel #1, available buffer=value_2 for BH RLC channel #2, etc.) or destination routing ID (e.g., available buffer=value_1 for destination routing ID=address1, available buffer=value2 for destination routing ID=address2, etc.). An IAB node receiving the flow control message may use the information to control the traffic flow toward the sender. The IAB node may throttle or pause traffic associated with a certain BH RLC channel and/or destination if the flow control message indicates a low available buffer for the concerned traffic. The control of the traffic flow may be an increase of the traffic flow if the flow control was indicating a high available buffer value. In Rel-16, the exact actions taken on flow control and the configurations/values of thresholds and other parameters to trigger flow control message (e.g., buffer threshold values, polling timers, etc.) are not specified and are left to IAB/network implementation.

In Rel-16, pre-emptive buffer status reporting (BSR) has been specified. An IAB node may trigger BSR to its parent node(s) even before (new) data has arrived in its UL buffer. An IAB node may trigger based on the BSR that it has received from its child nodes or WTRUs, or scheduling grants it has provided to them (e.g., an indication of antici- pated data). No specific enhancement related to UL flow control has been specified in Rel-16. Legacy NR mecha- nisms are applied where an IAB node controls the flow of UL data from its child nodes and WTRUs by providing them with proper UL scheduling grants based on the BSR received from them. In Rel-16 and Rel-17 specifications, IAB nodes are assumed to be static nodes. Handover of an IAB node (also referred to as migration or relocation) from one IAB-donor to another IAB-donor is supported for (i) load balancing and (ii) handling radio link failures (RLFs) due to blockage, e.g., due to moving objects, such as vehicles, seasonal changes (foliage), or infrastructure changes (new buildings). In Rel-16, only intra-donor CU handover is supported (i.e., the target and the source parent DUs of the IAB node are controlled by the CU functionality of the same IAB-donor).

The Rel-16 IAB specification supports IAB connectivity via Multi-RAT Dual Connectivity (MR-DC). For example, an IAB node may be connected to the network via E-UTRAN-NR Dual Connectivity (EN-DC), where the mas- ter node is an LTE node and the secondary node is an NR node.

Another aspect of the Rel-16 IAB specification is that the IAB it is completely transparent to WTRUs. That is, to a WTRU's, the IAB nodes appear to be normal base stations.

Rel16 IAB does not benefit fully from mobility enhance- ments developed in R16. For example, conditional handover (CHO) trigger conditions and actions are specific to a non-backhaul architecture, and do not take into account criteria related to IAB, such as topology-wide fairness, reduction of multi-hop latency, load/buffer conditions, num- ber of served WTRUs and descendant IAB nodes, backhaul RLF, etc.

Methods for CHO and CPC in IAB

Embodiments of this disclosure may be described for an IAB node in a multi-hop IAB network (i.e., the MT part of an IAB node or/and the DU part of an IAB node). The embodiments of this disclosure may be (e.g., equally) appli- cable to other kind of nodes or devices, such as a traditional wireless device/WTRU, or a sidelink WTRU acting as a WTRU to WTRU relay or WTRU to NW relay (e.g., over sidelink). The terms IAB node, MT part of an IAB node or DU part of an IAB node, WTRU, WTRU relay, and remote WTRU may be used interchangeably herein.

A direct descendant or a child node of an IAB node may be an IAB node/WTRU that may be directly connected to the IAB node (e.g., a mobile terminal or node being served by the IAB node). In a multi-hop case, an IAB node may be referred to be serving a node/WTRU indirectly if the UL/DL traffic of the WTRU/node has to traverse through the given IAB node before arriving at the WTRU/node (in the UL direction) or the IAB-donor node (in the DL direction). The generic term "descendant" is used herein to refer to all the nodes/WTRUs that may be directly or indirectly served by the IAB node.

Mobility Actions at the IAB Node

In the following embodiments, a mobility action may comprise any one or more of the following:

The WTRU may apply a reconfiguration that includes to an associated cell for which the configuration may be stored, and/or for which the selected cell may be determined based on, e.g., any of the same criteria discussed herein for conditionally triggering a mobility action.

The WTRU may apply a reconfiguration for a Secondary Cell Group (SCG), such as any of PSCell addition, PSCell change, CPAC (conditional PSCell change), CPA (conditional PSCell addition), release of a PSCell (or SCG), etc., to an associated cell for which the configuration may be stored, and/or for which the selected cell may be determined based on any of the criteria herein.

The transmission to another WTRU (e.g., a parent or child node) of a flow control polling message or similar message to request the load of the parent/child node (e.g., possibly to an associated cell for which the configuration is stored).

A change in role of a Master Cell Group (MCG) and/or SCG (e.g., the MCG becoming the SCG, or vice versa) to which an IAB node is connected.

The activation or deactivation/suspension of an SCG or an SCell that may belong to the MCG or SCG, wherein, for example, the deactivated/suspended/dormant SCG or SCell may operate in a power saving mode with limited functionality (e.g., basic Radio Link Monitor- ing (RLM) without PDCCH monitoring).

A change in a routing table, e.g., changing the next destination node for some UL packets. This may be realized, for example, by switching between pre-con- figured routing tables depending on the fulfilment of associated configured conditions (e.g., use routing table A while condition x is fulfilled, routing table B while condition y is fulfilled, etc.).

The change in the routing table may be related to changing the IAB node's own routing table or informing another node (e.g., a child IAB node) to change its routing table.

Transmission of a BH RLF indication to a child node, possibly of a specific type.

The type of the BH RLF indication also may be one of the conditions/criteria for determining whether a mobility action is to be taken.

Changing of the mapping of one or more ingress LCHs to one or more egress LCHs. Changing of the mapping may include, and non-limited to, changing the mapping of an (e.g., specific or given) ingress LCH or type of ingress LCH to a (e.g., specific or given) egress LCH or type of egress LCH, changing the number of (e.g., allowable) ingress LCHs mapped to an (e.g., specific or given) egress LCH, changing from a configured mapping to another configured mapping.

An IAB node configured with a mobility action may be configured with one or multiple cell configurations (e.g., candidate MCG or SCG). An IAB node configured with a mobility action may select an associated cell configuration to which to perform the mobility action based on similar measurements associated with the condition that triggered the mobility action. Such measurements may be associated with reports from other nodes/cells associated with the configuration itself.

In general, the IAB node may monitor a set of triggering conditions, each associated with one or more configurations, and when the triggering conditions are fulfilled, it may apply the concerned configuration and any relevant procedures associated with the configuration(s).

Mobility Action Triggered on Conditions Related to Traffic Load and/or Traffic Type In one embodiment, an IAB node may trigger a mobility action upon fulfilment of triggering condition(s) related to a measure of traffic load or/and traffic type at the IAB node itself and/or at another node/WTRU (a parent and/or a child node). An IAB node may be configured with a triggering condition (e.g., via RRC signaling, F1 signaling, pre-configuration by user or operator, operation, administration, and maintenance (OAM) signaling, etc.) related to a load measurement. When the triggering condition(s) is(are) satisfied, the IAB node may trigger the mobility action. The specific mobility action to be taken may be specified (e.g., explicitly with the condition) or may be implicit (e.g., the specifications may define a plurality of allowed mobility actions responsive to any particular trigger event that the IAB node may select). In other embodiments, it may be left to implementation.

In an embodiment, an IAB node may be configured with any of the following triggering conditions for mobility actions based on traffic load or/and traffic type:

Conditions based on traffic load information (e.g., flow control messages, BSR or information received from one or more other nodes, and/or its own flow control metrics) received from one or more other nodes. Such a condition may be based on any one or a combination of:

The number of messages received from another node over a time period

For example, a WTRU may trigger a mobility action if the number of flow control messages received from and/or transmitted to a parent/child node in a predefined or configured time period exceeds a threshold.

The value of, or combination of, the flow control value (e.g., available buffer size) for one or more channels in a flow control message or in a PDU (possibly cumulative over different hops).

For example, a WTRU may trigger a mobility action if at least one value of the available buffer size for a specific RLC channel (in a received or transmitted flow control message) is below a threshold.

The number of channels reported, possibly with a certain condition.

For example, a WTRU may trigger a mobility action if it receives and/or transmits a flow control message where the number or percentage of BH RLC channels reported having a certain condition (e.g., available buffer size below a threshold) is above a certain threshold.

The number of child/parent nodes from which flow control messages have been received and/or to which flow control messages have been transmitted, possibly over a given time, possibly with the conditions given herein.

For example, a WTRU may trigger a mobility action if it receives/transmits a flow control message from/to at least k nodes, whereby such messages satisfy one of the conditions described herein.

The number of flow control polling messages received/transmitted.

One or more particular RLC channel(s) meeting one of the conditions defined herein.

For example, one of the conditions described herein may be configured (e.g., only) for one or certain RLC channels (e.g., RLC channels configured as such, RLC channels configured with a specific property—such as priority—for which the condition is to be verified, RLC channels associated with a DAPS bearer, etc.).

In embodiments, such conditions may be derived from:

Information received from child nodes/WTRUs.

Conditions related to BSRs, pre-emptive BSRs, and SRs received from child nodes/WTRUs. This may be an indication of how much UL data and what type of data is on the way to the IAB node. The IAB node may trigger a mobility action based on that, for example, if the current BH link to a parent node is not deemed to be sufficient to accommodate the upcoming UL data.

Conditions related to UL flow control information received from child nodes, which, for example, may be an UL H2H flow control message introduced at the BAP level, where IAB nodes may tell their parent nodes about their UL buffer status. This UL H2H flow control information may be just the total UL buffer status (e.g., total buffer absolute value, total buffer percentage value, remaining buffer absolute value, remaining buffer percentage value, etc.) or it may be on a BH RLC channel or LCH group level.

Some examples of triggering conditions based on BSR or (e.g., explicit) H2H UL flow control received from child nodes/WTRUs may be any of the following cases:

When the total expected UL data (e.g., computed from the received BSR or/and H2H UL flow control of the child nodes) may exceed a certain threshold.

When the expected UL data of a certain type (e.g., computed from the BSR or H2H UL flow control messages of the child nodes concerning LCHs or LCH groups of a certain QoS) may exceed a certain threshold.

When the total number of scheduling requests from the child nodes may exceed a certain threshold.

Information received from parent nodes:

Parent nodes may inform their child nodes about their UL buffer status (e.g., H2H UL flow control message from parent node), from which the child nodes may infer how many scheduling grants they may receive in the near future. For example, a mobility action may be triggered when an IAB node gets UL buffer status (e.g., total buffer size) from a parent node indicating a value (absolute or percentage) above a certain threshold.

Parent nodes may inform their child nodes about the UL scheduling grants they may expect to receive from them. For example, a parent node may inform a child node that it may be given a certain number of resources (e.g., a certain number of PRBs, time slots, resources to transport a certain number of bytes, etc.) within a certain time frame (e.g., within the next x slots, ms, etc.). This may be a minimum, expected, or maximum value, and it may be a total value or it may be specified per BH RLC channel (or BH RLC QoS). A mobility action may be triggered based on this. For example, an IAB node may trigger migration to a (pre-configured) candidate parent node if it receives information from the current serving parent node indicating that the maximum expected UL scheduling grant to be received is below a certain threshold (e.g., well below the current UL buffer level at the IAB node).

Condition based on its own flow control metrics/measurements and/or measure of traffic load: Any of (e.g., each) of the above conditions related to transmission/reception of a flow control message (or similar traffic load messages) may apply also to the measurement/determination of such metrics at the WTRU that triggers the mobility action (and not necessarily based on the fact that it triggered such transmission).

For example, a WTRU may be configured with a condition on the number of RLC channels having available buffer size above/below a threshold.

For example, a WTRU may be configured with a condition based on the number of consecutive flow control messages triggered/transmitted over a time period—if this number of messages exceeds a threshold, the WTRU may trigger a mobility action. Such condition may further be associated to only certain RLC channels, as configured by the network.

For example, the WTRU may be configured with a condition on the buffer size associated with a given BH RLC channel, which could be a threshold associated with the current buffer level, the available buffer size, the desired buffer level, the remaining/spare buffer level (e.g., mobility action triggered when the UL buffer size of the BH RLC channel is above/below a certain threshold).

These may be actual values (e.g., in Mbytes) or percentage values (e.g., mobility action triggered when the UL buffer size of a given BH RLC channel reaches 85%).

Instead of or in addition to buffer sizes for a given BH RLC channel, a threshold associated with the total UL buffer size may be specified, which could also be actual values or percentage values.

The buffer size associated with a given radio bearer that is being served directly/indirectly by the IAB node, which may be any of a threshold associated with the current buffer level, the available buffer size, the desired buffer level, and the remaining/spare buffer level.

These may be actual values (e.g., in Mbytes) or percentage values (e.g., mobility action triggered when the UL buffer size of the data for the given DRB may reach 85%).

Instead of or in addition to buffer sizes for a given DRB, a threshold associated with the total UL buffer size for DRBs may be specified, which could also be actual values or percentage values.

A total UL buffer threshold that comprises the UL data belonging to DRBs that are being served by the IAB node (i.e., where the IAB node is the access node) as well as the UL data that are arriving via BH RLC channels with the child nodes (i.e. where the IAB ode is the intermediate node)

Condition based on the QoS associated with one or more bearers and associated RLC channels.

The QoS of the DRBs that may be directly/indirectly served by the IAB node (e.g., mobility action triggered when a DRB having a certain QoS is established by a WTRU that is directly/indirectly served by the IAB node and/or mobility action triggered when there are no more DRBs of a certain QoS that are directly/indirectly served by the IAB node)

The QoS of the BH RLC channels that may be served by the WTRU (e.g., mobility action triggered when a BH RLC channel of a given QoS is established between the IAB node and a child node, mobility action triggered when the last BH RLC channel of a given QoS is released, etc.).

Conditions based on the number of attached child nodes:

a WTRU may trigger a mobility action based on the number of attached child nodes, possibly of a specific type (e.g., IAB child node vs WTRU). Such condition may be based on any one or a combination of the following:

The number of child nodes.

The number of child nodes of a specific type (IAB vs WTRU).

The total number of child nodes and leaf nodes.

For example, a WTRU may receive a message indicating the total number of leaf nodes associated with a specific child.

The number of child nodes (e.g., direct descendant WTRUs or IAB nodes, indirect descendant WTRUs or IAB nodes). For example, mobility action triggered when the number of child nodes may become larger or smaller than a certain threshold.

Different triggering conditions/thresholds may be specified for the directly served and indirectly served or for the total number of child nodes. For example, threshold1 regarding the directly served child nodes, threshold2 regarding the indirectly served child nodes, threshold3 for all the child nodes, etc.

Conditions associated with the number of BH RLC channels at an IAB node:

This, for example, may be the total number of ingress BH RLC channels from the direct descendant nodes of the IAB node.

Different thresholds may be set for any of BH RLC channels that are mapped 1:1, BH RLC channels that are mapped N:1, and the total number of BH RLC channels.

Conditions based on the number of bearers (DRBs) and/or number of QoS flows associated with a path and/or RLC channel for a specific path: A WTRU may determine the number of DRBs, possibly associated with a specific RLC channel, at the WTRU itself, or at a parent/child node of a WTRU, and such condition may be based on that number.

For example, a WTRU may trigger a mobility action if the number of DRBs at one or more RLC channels goes above/below a threshold.

The number of radio bearers that are directly/indirectly served by the WTRU (e.g., mobility action triggered when the total number of the DRBs of the WTRUs that are directly served by the IAB node becomes larger than or smaller than a certain threshold).

Conditions based on a measured throughput of one or more RLC channels at the WTRU or communicated via a different WTRU.

For example, a WTRU may trigger a mobility action if the measured throughput of an RLC channel at the WTRU drops below a threshold.

Conditions based on the path, or available path(s) of the WTRU or any child/parent node: the trigger of a mobility action may further be conditioned on the available paths (e.g., backhaul paths) of the WTRU itself, or other nodes (e.g., child IAB nodes).

For example, a WTRU may trigger a mobility action if the WTRU, and/or a child/parent node, is configured with a redundant path (e.g., SCG).

Combinations of the above conditions (e.g., based on flow control or others) may also be configured. For example, a condition may be an "AND" operation between one or more of the above conditions, or an "OR" operation between one or more of the above conditions. For example, a WTRU may trigger a mobility action if the number of flow control messages received over a configured time period and including at least one RLC channel with available buffer size below a first threshold, exceeds a second threshold. For example, a trigger condition may be the number of the BH RLC channels with latency below a certain value or data rate requirement above a certain value. Also, timing and averaging/filtering aspects may be considered, instead of triggering based on absolute values. For example, a time to trigger could be specified (e.g., when the number of the BH RLC channels or the total expected UL traffic is above a certain threshold for a certain duration).

Combinations of the above conditions may comprise a weighting of multiple metrics. For example, one condition may serve as a weighting factor for another condition. For example, a flow control measure associated with an RLC channel may be weighted by the number of DRBs and/or QoS flows associated with that RLC channel.

FIG. 4 is a flowchart of an exemplary process of conditional HO in accordance with an embodiment. As shown at 401, a WTRU may be configured with one or more candidate parent nodes for performing conditional HO. Each candidate parent node may have a BH RLF configuration comprising at least an indication of whether a CHO to that parent node should trigger BH RLF and, in the case that a CHO to that parent node triggers BH RLF, an index/value to be sent in the BH RLF to the child. Also as shown, the WTRU may be configured with a threshold number of flow control events/messages that may be triggered over an evaluation window (time period) that may be used as a threshold condition for initiating HO.

At 403, an IAB node may measure the number of flow control messages (or flow control events) triggered to the IAB parent node over the configured evaluation window. A flow control event here may be as simply having a buffer occupancy that exceeds another (possibly configured) threshold. Alternatively, the flow control event may comprise transmission(s) of a flow control message (and the IAB node counts the number of such messages transmitted in the evaluation window).

At 405, if the number of messages/events exceeds the threshold configured in step 401, flow may proceed to 407, where the IAB node may select the candidate IAB parent node with the best reference signal received power (RSRP) measurements. Otherwise, the IAB node may continue to monitor for the HO trigger event (e.g., step 403). After selecting the candidate IAB parent node with the best RSRP measurements, the IAB node may perform CHO to the selected parent node (step 409).

At step 411, the IAB node may determine If the selected parent node is configured with a BH RLF configuration. If so, in step 413, the IAB node may send a BH RLF message to a child node. The BH RLF message may include the configuration information associated with the parent node (e.g., the index of the parent node). Other configuration information may be sent (e.g., the RRC configuration to be applied by the child node for its own CHO). If the selected parent node is not configured with a BH RLF configuration, this step may not be performed.

The HO may then proceed.

Mobility Action Triggered on a Condition Related to Latency

In one embodiment, an IAB node may trigger a mobility action on a condition related to latency associated with one or more routes over the backhaul. An IAB node may be configured with a condition (e.g., via RRC signaling, F1 signaling, pre-configuration by user or operator, OAM signaling, etc.) related to latency. When such condition is satisfied, the IAB node may trigger the mobility action. The specific mobility action to be taken may be specified (e.g., explicitly with the condition) or may be implicit (e.g., the specifications may define a plurality of allowed mobility actions responsive to any (e.g., particular) trigger event that the IAB node may choose from. In other embodiments, it may be left to implementation).

In an embodiment, an IAB node may be configured with any of the following triggering conditions for mobility actions based on latency:

Conditions based on measured latency over a route: An IAB node may be configured with a measurement of the observed latency of one or more data PDUs (e.g., DL data PDUs) over a route from the donor to the IAB node. Such measurement may be performed based on one or more timestamps added by the donor and/or other nodes within the backhaul. A WTRU may determine the overall latency of one or more data PDUs and perform a mobility action if, for example:

The average latency, (e.g., over a time period), is above/below a threshold

The maximum/minimum latency, (e.g., over a time period), is above/below a threshold Conditions based on the number of hops over a route:

For example, the WTRU may trigger a mobility action if the number of hops for a specific route is above/below a threshold Conditions based on meeting the Packet Delay Budget (PDB) of one or more PDUs For example, a WTRU may trigger a mobility action if the WTRU receives one or more PDUs, (e.g., over a time period), where the PDB associated with the PDUs is not met (or is met only within a minimal amount of time).

Conditions based on a cost function related to latency associated with one or more routes: A WTRU may determine a cost function associated with one or more of its routes over the backhaul. Such a cost function may be calculated based on elements provided to the WTRU, e.g., via static configuration, measurements, or metrics exchanged. Such a cost function may be related to:

Computed or expected latency over a route: Specifically, a latency function may be computed:

Based on the configured number of hops on that route

Based on the observed latency of past data transmissions on that route

Based on the reported load balancing measures (or computed data load) on that route Based on the Uu measurements (e.g., cell RSRP/reference signal received quality (RSRQ), etc) associated with that route Or a combination of the above factors A WTRU may trigger a mobility action if the computed latency function is above/below a threshold.

Conditions based on the type of bearer configured: A WTRU may trigger a mobility action based on any of the above conditions if the WTRU is configured with a specific type of bearer (e.g., a high priority bearer, a bearer having a specific QoS, a bearer configuration parameter enabling such operation, etc.)

Conditions based on measurements of a cell and/or another WTRU: A WTRU may be configured with a condition based on the measurement of its serving cell and/or other Radio Resource Management (RRM) measurements (as in legacy CHO/CPC)

Combinations of the above conditions may also be configured. For example, a condition may be an "AND" operation between one or more of the above conditions, or an "OR" operation between one or more of the above conditions.

Combinations of the above conditions may comprise a weighting of multiple metrics. For example, one condition may serve as a weighting factor for another condition.

Similar combinations of conditions from different embodiments described herein (e.g., load and latency) are also possible.

Mobility Action Triggered on a Condition Related to Route Suitability

In one embodiment, an IAB node may trigger a mobility action based on the suitability of a route. An IAB node may trigger such a mobility action if it determines that a current route may be no longer suitable. This determination may be based on determination at the IAB node. For example, if the IAB node has multiple paths to the donor node, the determination may include measuring/observing the latency or throughput of packets experienced over the different paths, realizing that the performance over one path is not acceptable; the IAB node may trigger a mobility action that will change or remove the unacceptable path, e.g., changing the parent nodes that leads to this path.

The determination may be based on determining that an intermediate node required for the communication path to exist is no longer present and/or becomes no longer suitable. For example, a node may remove itself from a routing path because it determines that it is no longer suitable (e.g., if it is experiencing processing/buffer limitations to handle all the packets passing through it). The node may be an intersection for several paths for different destination IAB node and may decide to remove itself from one or more of those paths.

The node may inform other devices (e.g., child nodes) for example, with a BH RLF or similar indication, so that they may change their paths/parents. The indication may also be an (e.g., explicit) indication to stop forwarding data belonging to (e.g., given or specific) BH RLC channels (e.g., if a node detects that it is reaching processing limits, it may indicate to some of the child nodes to use alternative routes for data belonging to certain BH RLC channels).

Suitability of a node within a path may be determined based on:

Whether there are sufficient or insufficient resources (e.g., processing, memory, etc) at a given node, or along a specific path Whether a node may have sufficient security credentials to forward/transmit certain data Whether there may be an active route/transmission path to the desired destination in the routing tables of a given node In one example, nodes may communicate their available resources (e.g., periodically, on request, on some event, etc.), so that child nodes may use that information to trigger mobility action. For example, a trigger condition related to this may be changing the path/route of certain BH RLC channels to another parent node if the default parent node is indicating that it is reaching its processing limit.

Mobility Action Triggered on Condition of Receiving a BH RLF or Like Message from Parent In one embodiment, the IAB node may be configured with a mobility action that may be triggered upon the reception of a BH RLF indication or similar message from a parent node. A specific condition and associated action may depend on the type of BH RLF. A BH RLF indication may indicate a (e.g., specific or given) type (e.g., type 1=BH radio problem detected, type 2=BH radio problem detected and trying to recover, type 3=BH radio successfully recovered, type 4=BH recovery failed, etc.). The WTRU may associate a specific mobility action described herein, and/or a specific condition described herein to each BH RLF event.

Some non-limiting examples may be:

the IAB node may be configured with a set of candidate target parent nodes/cells, and when it receives a BH RLF indication from its current parent node:

if the indicator is of type 4 (i.e., BH RLF recovery failure), it may apply a mobility action to switch its serving node/cell to the candidate parent node/cell that has the best radio condition.

if the indicator is of type 2 (i.e., parent node trying to recover from BH RLF), it may temporarily change the routing of UL packets to an alternative parent node (e.g., a secondary node, if already configured).

if the indicator is of type 3 (i.e., BH successfully recovered), it may switch back the routing of UL packets to the parent node.

In another example, the child node may be configured with a mapping between BH RLF type (possibly indicated in the RLF message) and potential candidate cell (e.g., only check the conditions and perform CHO if the received BH RLF type may match the RLF type associated with the candidate).

For example, the WTRU may be configured with a mapping between BH RLF type (possibly indicated in the RLF message) and mobility action (e.g., perform a CHO for one type, and perform a PSCell addition for another type).

Mobility Action Triggered by Different Condition/Value/Threshold Depending on the Value of Another Metric/Condition In one embodiment, an IAB node may be configured with a condition, wherein the criteria for the mobility action associated with that condition may further depend on one or more other criteria/conditions mentioned herein. The IAB node may be configured with a condition for triggering a mobility action. Such condition may comprise of satisfying one or more criteria associated with that condition. An IAB node may use a first criteria if another condition is satisfied and use a second criteria if a second condition is satisfied.

For example, an IAB node may be configured with a first measurement condition and a second measurement condition. The mobility action may be triggered upon the fulfillment of the first measurement condition, if the available UL buffer size is below a threshold, or on the fulfillment of the second measurement condition if the available UL buffer size is above a threshold.

Temporary Mobility Action Based on the Above Conditions

In one embodiment, an IAB node may be configured with a mobility action that may be performed temporarily and/or reversed once the condition which triggered the mobility action is no longer met. An IAB node may be configured to perform a mobility action based on the triggering of a first condition. Once the first condition is met and the IAB node initiates the mobility action, the IAB node may start monitoring a second condition (possibly related to the first condition). Once the second condition is met, the IAB node may reverse/stop the initial mobility action.

In one exemplary embodiment, a WTRU may be configured to perform a PSCell addition when the maximum number of allowed bearers associated with an RLC channel at the WTRU, or at a parent node, exceeded. Once the condition is triggered and the PSCell is added, the WTRU may start to monitor a second condition (i.e., that the number of bearers associated with an RLC channel at the WTRU falls below a threshold). The WTRU may release the initially added PSCell once the second condition is triggered.

In another example, the second condition may be based on a configured duration. For instance, the IAB node may initiate a timer (e.g., a value of which may be specified along with the first condition, specified in the standards, or left to implementation) when the first mobility action is initiated, and reverse the action (e.g., connect route of specific BH RLC channels to the original parent node) when the timer expires.

A combination of a timer and another secondary condition may also be envisioned. For example, the monitoring of the second condition is not started before the timer expires, the monitoring of the second condition is performed only until the timer expires, the monitoring of the second condition is done when the timer expires and if the conditions are not fulfilled, the timer is started again

WTRU/IAB Node Sets Up a Temporary Secondary Link (e.g., SCG) to Determine Whether to Perform HO to a Target In one embodiment, an IAB node may initiate a temporary secondary link (e.g., an SCG) with a candidate cell prior to performing a mobility action (e.g., HO to the candidate). Said temporary secondary link may be for the purposes of measuring metrics associated with any of the conditions for triggering a mobility action mentioned herein (e.g., load information, latency information, etc. received from other nodes). The IAB node, while the temporary secondary link is set up, may collect metrics over the second link, and may use such metrics for determination of whether to perform HO to the second link.

For example, an IAB node may be configured with a first condition based on metrics over its current link/parent node (e.g., based on DL latency of received PDUs—such as the average latency of the received PDUs is above a threshold). If the first condition is met, the IAB node may initiate a PSCell addition to a candidate node. Upon successful PSCell addition, the IAB node may monitor a second condition based on metrics over the added link/parent node associated with the PSCell (e.g., also based on sidelink (SL) latency of the received PDUs). Such condition may be based on both PCell link and PSCell link. For example, the conditions may be:

The average DL latency over the PSCell link is below a threshold

The average DL latency of the PSCell is lower than the average DL latency over the PCell The IAB node may measure such condition over a time period. For example, the IAB node may start a timer at successful PSCell addition, and may determine whether the second condition may be met prior to expiry of a timer.

If the second condition is met, the IAB node may perform a HO to the PSCell itself. Alternatively, the IAB node may perform a role change, possibly followed by a release of the PSCell (the old PCell) after the role change. If the second condition is not met, the IAB node may release the PSCell and not perform the HO to the target. The IAB node may then perform PSCell addition to another configured candidate. The IAB node may continue to try other configured candidates as long as the first condition is met.

The above example can be applied to other criteria or combinations of criteria as conditions, where the first condition may be related to metrics collected over the first link, and the second condition may be related to metrics over the first and/or second link. In addition, the first and second conditions may, potentially be based on different criteria (load vs. latency vs. #hops, etc.), respectively.

WTRU/IAB Node Receives Metrics from Candidate Target Node

In one embodiment, an IAB node may derive a condition or receive metrics for determining a condition for a mobility action from the candidate node. Any of the metrics mentioned herein may be used in such embodiments. For example, an IAB node may receive load information, latency information, information about the number of hops, etc. from a candidate node. The IAB node may use such information to determine whether to perform a mobility action. The IAB node may receive such information from broadcast signaling. Alternatively, the IAB node may request this information from the candidate node prior to the mobility action.

For example, a candidate parent node may broadcast load information or information about the number of hops in system information. The IAB node may use this information as part of the condition for determining whether to perform a mobility action (e.g., HO). The IAB node may be configured with a condition for performing a HO to a candidate node based on whether the metric in question (e.g., load) is better on the second node than the first node.

In another example, an IAB node may be configured with a first condition for triggering a request to one or more candidate nodes for metric information (e.g., load, latency, etc.). For example, an IAB node may trigger a request to a candidate node for load information if the measured load information at the IAB node (or obtained from its current parent node) is above a threshold. Such request may be performed via:

A System Information (SI) request
    For example, a dedicated SI may include such information, and may be obtained by request only
A RACH (Random Access Channel) procedure
    For example, a 2-step or 4-step RACH procedure may be used to request and obtain such information without connecting to the target Following reception of such information, an IAB node may be configured with a second condition, which depends on the information obtained, to determine whether to perform a HO to the candidate that provided the information. For example, the IAB node may perform a HO to the candidate if the average latency of PDUs (as obtained from the second node) is some threshold lower than the latency of PDUs experienced on the current parent node.

A Mobility Action at a Child/Parent Node May be Conditioned/Related to a Mobility Action at a Parent/Child Node In one embodiment, an IAB node may perform any mobility action described herein upon determining/detecting the execution of a related mobility action at a parent/child node. For example, an IAB node may perform a mobility action upon determining that a parent node has executed a similar/related mobility action.

For example, an IAB node may be configured with multiple candidate cell configurations (e.g., for the PCell, PSCell, etc.). The IAB node may trigger a CHO to a candidate cell configuration upon determining, e.g., via a message received from a parent node, that the parent node has triggered a related reconfiguration (e.g., PSCell addition, SCG release, etc.). This message/indication from the parent node may include (e.g., implicit or explicit) information regarding the mobility action to be taken by the IAB node. For example, the IAB node may be configured with an identity associated with each CHO candidate. The parent node also may be configured with different mobility conditions to monitor and associated actions to apply. Along with these configurations, the parent node may also be configured with associated identities of each CHO candidate of the child node (the parent does not necessarily have to know what these identities refer to). When the conditions for a certain mobility action at the parent node are triggered, the parent node may send an indication to the child that may include the CHO identity associated with the fulfilled condition. This, for example, may be a new indicator, or an enhancement of an already existing indicator such as a BH RLF indication that may include additional information elements, in this case, the CHO candidate identity. Upon the reception of this message, the child node may execute the corresponding mobility action (in this example, handover to the indicated candidate cell).

In one example, the indication received from the parent node may override the triggering conditions associated with the mobility action at the child. For example, when a message is received from the parent node indicating a CHO to a given candidate cell, the child node may perform the handover, even if the triggering conditions for the CHO are not fulfilled, or if there is a better candidate than the indicated one.

In another example, the child node may perform the handover only if the indicated candidate fulfills the CHO conditions.

In yet another example, the child node may perform the handover even if the indicated candidate does not fulfill the CHO triggering condition as long as the indicated candidate is the best cell among all the other candidates.

In a further example, the child node may perform the handover towards the cell that best fulfils the condition, even if that cell is different from the indicated cell.

In another example, the child node may perform the handover towards the best candidate cell among the candidate cells, whether it is the indicated cell or not, even if the conditions are not still fulfilled.

A Condition for Triggering a Mobility Action May be Evaluated/Monitored Only after a Mobility Action is Performed by a Parent Node In one embodiment, an IAB node may evaluate a condition for triggering a mobility action (based on any conditions described herein) only upon a mobility action triggered at a parent node. The IAB node may be configured with a condition, and may (e.g., only) begin performing evaluation of the condition upon being informed of the execution/triggering of a mobility action from a parent node. If the condition is satisfied at this time, the IAB node may trigger an associated/configured mobility action.

For example, an IAB node may evaluate a condition (e.g., CHO configuration) for performing a mobility action upon the reception of a BH RLF indication from a parent node (e.g., a type 2 indication, indicating that the parent node is trying to recover the link). If the condition is met (e.g., a candidate cell exists that satisfies the RSRP/RSRQ thresholds specified in the CHO configuration), the WTRU may perform the associated mobility action. Another example may be where the condition is based on UL buffer size, where the IAB node will perform the mobility action associated with UL buffer size (e.g., switch to candidate cell if UL buffer size is larger than a configured value) only after it has received a BH RLF indication from a parent node.

A WTRU Triggering a Second Mobility Action (e.g., BH RLF) May Depend on the Characteristics of a First Mobility Action (e.g., the CHO Candidate Configuration)

In this type of embodiment, a condition may result in triggering multiple mobility actions. In some cases, whether a second mobility action is triggered may depend on the characteristics/condition/outcome/consequences of the first mobility action.

For example, a WTRU may receive a HO, or trigger a conditional HO. For instance, the HO command, or the CHO candidate configuration may include an indication of whether the HO/CHO may also initiate a BH RLF. For example, a WTRU may be configured with a first CHO candidate that may require triggering a BH RLF, and a second CHO candidate that may not require triggering a BH RLF. If the WTRU selects the first CHO candidate, the WTRU may trigger a BH RLF to a child node. If the WTRU selects a second CHO candidate, the WTRU may not trigger a BH RLF. For example, a WTRU may receive a HO command with a flag/indication of whether a BH RLF should be triggered to its child nodes.

Mobility Action—Revision to Mapping Between an Ingress LCH and an Egress LCH In one embodiment, the mobility action may include a change of the mapping from an ingress LCH to an egress LCH at the IAB node or WTRU relay. The mobility action may be triggered by any of the conditions mentioned above. The change of the mapping from an ingress LCH to an egress LCH at the IAB node or WTRU relay may include any of the following:

a change from one number of ingress LCHs which may be mapped to an (e.g., given or specific) egress LCH, to another number of ingress LCHs. For example, the change may include changing from a (e.g., configured) N:1 mapping of LCHs to a 1:1 mapping (where data of an (e.g., each) ingress LCH may be forwarded on its own egress LCH), or vice versa.

A change from an N:1 mapping to a 1:1 mapping or vice versa may result and/or necessitate any of a suspension and/or activation of one or more egress LCHs. When changing from N:1 to 1:1, a number of suspended LCHs may be triggered by the mobility action/condition. When changing from 1:1 to N:1, a number of egress LCHs which served in the egress may be suspended (e.g., remain configured, but not used to transmit data).

a change from one (e.g., configured) mapping of one or more ingress LCHs to one or more egress LCHs to another configured mapping of one or more ingress LCH to one or more egress LCHs. For example, the WTRU may be configured with two different mappings of ingress LCHs to egress LCHs. Based on any of the mobility actions described herein, the WTRU may change from a first of the two mappings to a second of the two mappings.

Changing a specific ingress LCH, group of ingress LCH, or ingress LCH type to be mapped from one egress LCH to another egress LCH. Specific ingress LCH, group of ingress LCH, ingress LCH may be defined (e.g., possibly) in terms of specific LCH, group of LCH, or LCH type. The LCH type may indicate a (e.g., specific) property associated with the LCH. The LCH type may be, include and/or identify any of:

a priority associated with the LCH;

a configuration parameter associated with the LCH, such as any of:

whether the LCH has HARQ enabled/disabled; and

Whether the LCH has an LCP restriction (e.g., to a configured grant, etc);

whether the LCH may serve for one purpose over another, such as,

For example, whether the LCH may be a sidelink LCH versus a Uu LCH, and/or

For example, whether the LCH may be a signaling or data LCH; and

The LCH (e.g., the egress LCH) may be a default LCH (For example, the change may include changing the mapping from one or more LCH or LCH types to a default egress LCH, or removal of LCHs from being mapped to the default LCH), In one embodiment, a WTRU may be configured with two different mappings (in terms of RRC configuration) of ingress LCHs to egress LCHs. The WTRU configuration may indicate (specify) one or more conditions for changing from a first mapping to a second mapping. The WTRU configuration may indicate (specify) one or more conditions for changing back from the second mapping to the first mapping. For example, a WTRU may change from a first mapping to a second mapping based on conditions related to measurements (e.g., measured constant bit rate (CBR) is larger/smaller than a first threshold and/or Uu/SL RSRP is larger/smaller than a first threshold). The WTRU may change from the second mapping to the first mapping. The change from the second mapping to the first mapping may be triggered based on any of (e.g., some configured) time period and one or more (e.g., additional) conditions. The conditions (e.g., additional conditions) may be related to measurements (e.g., measured CBR is larger/smaller than a second threshold and/or Uu/SL RSRP is larger/smaller than a second threshold).

In one embodiment, a WTRU may be configured to change from an N:1 mapping to a 1:1 mapping (or vice versa) based on one or more conditions related to measurements (e.g., measured CBR is larger/smaller than a second threshold and/or Uu/SL RSRP is larger/smaller than a second threshold).

In one embodiment, a WTRU may be configured with two alternative egress LCHs for an (e.g., given or specific) ingress LCH along with a configuration for changing from one of the egress LCH to the other, and possibly vice versa, based on flow control status associated with that LCH/RLC channel, as defined herein.

Figure 5:
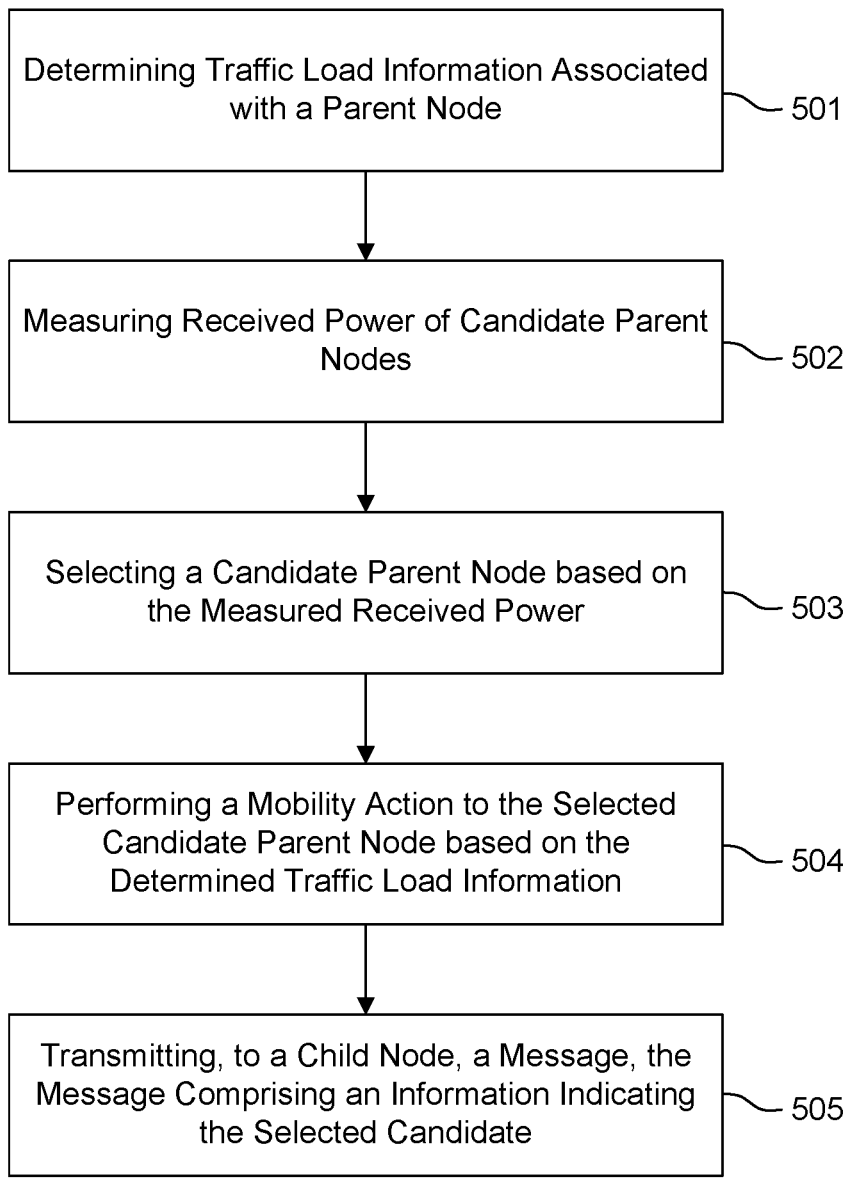
FIG. 5 is a flow chart illustrating an example of a method for performing a mobility action in IAB in wireless communication networks in accordance with an embodiment.

A Method for Performing a Mobility Action in IAB in Wireless Communication Networks According to the various embodiments described above, FIG. 5 depicts a flowchart of an exemplary method, implemented in a WTRU, for performing/triggering a mobility action such as a handover in IAB in wireless communication networks. The method may comprise any of the steps described below.

As shown at step 501, the WTRU may determine traffic load information associated with a parent node. The traffic load information may be received from the parent node associated with the traffic load. The traffic load information may have been determined, by the WTRU, based on a number of radio link control (RLC) flow control messages. The RLC flow control messages may be received by the WTRU and from the parent node, over an evaluation window or more particularly, over a time period. The traffic load information may be also determined based on buffer status reports received by the WTRU from the parent node. In an embodiment, the buffer status reports may be determined by the WTRU.

At step 502, the WTRU may measure received power of candidate parent nodes such that, according to step 503, the WTRU may select a candidate parent node based on the measured received power. More particularly, the selection of a candidate parent node may be based on a reference signal received power (RSRP) measurements. The selected candidate parent node differs from the parent node.

At step 504, the WTRU may perform a mobility action to the selected candidate parent node based on the determined traffic load information. The mobility action may be handover. The mobility action may be a change in the configured association of an ingress logical channel (LCH) to an egress LCH and/or vice versa. In an embodiment, the mobility action may be a change of the mapping of an ingress logical channel (LCH) to an egress LCH and/or vice versa. In an embodiment, the WTRU may trigger a mobility action to the selected candidate parent node based on a determination of the traffic load associated with a parent node, wherein the selected candidate parent node differs from the parent node.

At step 505, the WTRU may transmit, to a child node, a message, the message comprising an information indicating the selected candidate. The information indicating the selected candidate may be an index associated with one of the candidate parent nodes.

In an embodiment, the method may be implemented in a relay WTRU. In an embodiment, the method may be implemented in an Integrated Access and Backhaul (IAB) node.

INCORPORATION BY REFERENCE

The following references may have been referred to hereinabove and are incorporated in full herein by reference.

[1] 3GPP TS 38.331, "Radio Resource Control (RRC) protocol specification", v16.2.0
[2] 3GPP TS 38.300, "NG Radio Access Network; Overall description", v16.2.0
[3] 3GPP TS 38.340, "Backhaul Adaptation Protocol (BAP) specification", v16.2.0
[4] 3GPP TR 38.874, "Study on Integrated Access and Backhaul", v16.0.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FP-GAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1E, 2 and 3.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶ 6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A method implemented by a first wireless transmit/receive unit (WTRU) relay, the method comprising:
  determining traffic load information associated with a second WTRU;
  measuring received powers of one or more transmissions from a plurality of candidate WTRUs;
  selecting, based on the measured received powers, a candidate WTRU from the plurality of candidate WTRUs, wherein the selected candidate WTRU differs from the second WTRU;

on condition that a triggering condition related to the traffic load information is satisfied:
  performing a mobility action for mobility to the selected candidate WTRU; and
  transmitting, to a third WTRU, a message, wherein the message comprises an index associated with one of the candidate WTRUs indicating the selected candidate WTRU.

2. The method of claim 1, wherein the mobility action is a handover or a reselection.

3. The method of claim 1, wherein the selection of a candidate WTRU is based on one or more reference signal received power (RSRP) measurements.

4. The method of claim 1, wherein the traffic load information is determined by the first WTRU based on a number of radio link control (RLC) flow control messages received by the first WTRU from the second WTRU.

5. The method of claim 4, wherein the RLC flow control messages are received by the first WTRU during an evaluation window.

6. The method of claim 1, wherein the first WTRU is an integrated access and backhaul (IAB) node.

7. The method of claim 1, wherein the mobility action is a change in the configured association of any of: (1) an ingress logical channel (LCH) to an egress LCH; or (2) the egress LCH to the ingress LCH.

8. The method of claim 1 comprising receiving, from a network, a message indicating one or more mobility action conditions; monitoring for the one or more of the indicated mobility action conditions; and performing the mobility action for mobility to the selected candidate WTRU, on condition that at least one of the one or more indicated mobility action conditions is detected.

9. The method of claim 1, wherein any of the plurality of candidate WTRUs is a base station.

10. A first WTRU relay comprising circuitry, including any of a processor and a memory, configured to:
  determine traffic load information associated with a second WTRU;
  measure received powers of one or more transmissions from a plurality of candidate WTRUs;
  select, based on the measured received powers, a candidate WTRU from the plurality of candidate WTRUs, wherein the selected candidate WTRU differs from the second WTRU;
  on condition that a triggering condition related to the traffic load information is satisfied:
  perform a mobility action for mobility to the selected candidate WTRU; and
  transmit, to a third WTRU, a message, wherein the message comprises an index associated with one of the candidate WTRUs indicating the selected candidate WTRU.

11. The first WTRU of claim 10, wherein the mobility action is a handover or a reselection.

12. The first WTRU of claim 10, wherein the selection of a candidate WTRU is based on one or more reference signal received power (RSRP) measurements.

13. The first WTRU of claim 10, wherein the traffic load information is determined by the first WTRU based on a number of radio link control (RLC) flow control messages received by the first WTRU from the second WTRU.

14. The first WTRU of claim 13, wherein the RLC flow control messages are received by the first WTRU during an evaluation window.

15. The first WTRU of claim 10, wherein the first WTRU is an integrated access and backhaul (IAB) node.

16. The first WTRU of claim 10, wherein the mobility action is a change in the configured association of any of: (1) an ingress logical channel (LCH) to an egress LCH; or (2) the egress LCH to the ingress LCH.

17. The first WTRU of claim 10 configured to:

receive, from a network, a message indicating one or more mobility action conditions; monitor for the one or more of the indicated mobility action conditions; and perform the mobility action for mobility to the selected candidate WTRU, on condition that at least one of the one or more indicated mobility action conditions is detected.

18. The first WTRU of claim 10, wherein any of the plurality of candidate WTRUs is a base station.

* * * * *